United States Patent
Essig

[15] 3,682,041
[45] Aug. 8, 1972

[54] METHOD AND APPARATUS FOR DUPLICATING A KEY

[72] Inventor: Ted Essig, R.R. 3, Noblesville, Ind. 46060

[22] Filed: Jan. 22, 1971

[21] Appl. No.: 108,894

[52] U.S. Cl............................90/13.05, 76/110
[51] Int. Cl..................................B23c 1/16
[58] Field of Search................90/13.05; 76/110

[56] References Cited

UNITED STATES PATENTS

3,358,561  12/1967  Roxburgh et al. ........90/13.05

Primary Examiner—Gil Weidenfeld
Attorney—Woodard, Weikart, Emhardt & Naughton

[57] ABSTRACT

A method and apparatus for duplicating a key from a universal key blank. A plurality of tracer rods are mounted to a carriage on either side of a slot receiving a key to be duplicated. The tracer rods are coupled to a plurality of rotatable cutting tools mounted on either side of a second slot receiving a universal key blank. The tracer rods and cutting tools are held by a carriage movable the length and width of the key. Means are provided to rotate the cutting tools and to move the carriage. The carriage is housed within a cabinet having a pair of holders fixedly secured to its front wall. Each holder receives the universal key blank and the key to be duplicated and is operable to position the key blank and key respectively between the tracers and cutting tools.

9 Claims, 11 Drawing Figures

INVENTOR
TED ESSIG
BY
Woodard, Weikart, Emhardt & Naughton
ATTORNEYS

INVENTOR
TED ESSIG
BY
Woodard, Weikart, Emhardt & Naughton
ATTORNEYS

INVENTOR
TED ESSIG
BY
ATTORNEYS

INVENTOR
TED ESSIG
BY
Woodard, Weikart, Emhardt & Naughton
ATTORNEYS

3,682,041

METHOD AND APPARATUS FOR DUPLICATING A KEY

BACKGROUND OF THE INVENTION

1. Field of the Invention:
This invention is in the field of key duplicators.

2. Description of the Prior Art
A variety of devices have been provided for duplicating a key. Some of these devices are disclosed in the following U. S. Pat. Nos.: 2,469,027 issued to Beisser; 2,924,316 issued to Berninghaus; 3,116,665 issued to Reisner; 3,323,420 issued to Roxburgh; and 3,358,561 issued to Roxburgh et al.

The devices disclosed in the previously listed U.S. patents all require a particular key blank matched with the key to be duplicated. Thus, a variety of key blanks must be stocked and selected prior to duplicating the key. The present invention provides a method and apparatus for duplicating a key from a single universal key blank thereby eliminating the necessity for stocking a variety of key blanks.

SUMMARY OF THE INVENTION

One embodiment of the invention includes a method of duplicating a key comprising the steps of holding a key blank, holding said key, contacting tracer rods forcefully against both sides of the shank of said key, moving said rods and said shank with respect to each other so as to eventually contact the entire surface of both sides of said shank with said rods, rotating cutting bits on both sides of said blank, and coupling said bits to said rods so said bits will move directly with said rods and duplicate the movement of said rods.

Another embodiment of the invention includes an apparatus for duplicating a key having length and width from a key blank comprising a carriage, a plurality of tracer rods mounted to said carriage, a plurality of cutting tools rotatably mounted to said carriage, first means coupling said tracer rods to said tools, second means operable to cause movement between said rods and said key in a direction along said length, third means operable to cause movement between said rods and said key along said width, and power means operable to rotate said cutting tools.

It is an object of the present invention to provide an apparatus for duplicating a key from a single universal key blank.

It is a further object of the present invention to provide a key duplicator which duplicates the grooves and teeth of a key in a universal key blank.

It is a further object of the present invention to provide a method of duplicating a key from a universal key blank.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
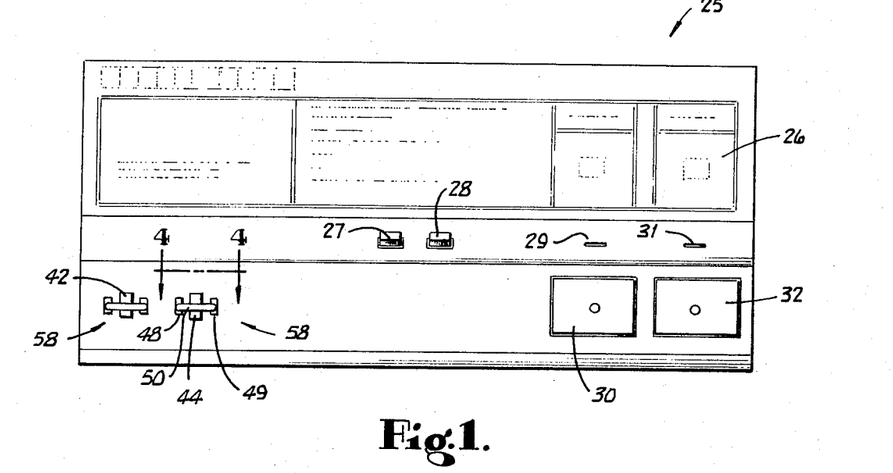
FIG. 1 is a front view of a key duplicator incorporating the present invention.
Figure 2:
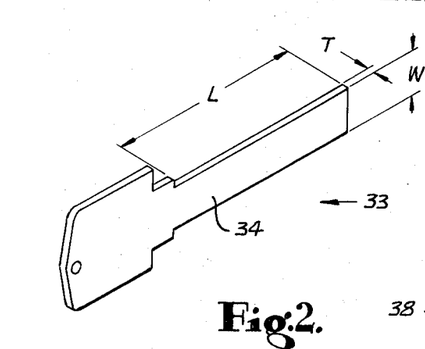
FIG. 2 is a perspective view of a universal key blank.
Figure 3:
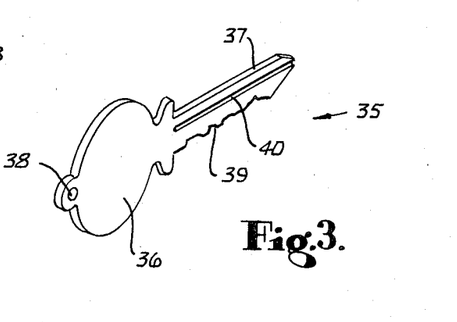
FIG. 3 is a perspective view of a typical key to be duplicated.

Referring now more particularly to FIG. 1, there is illustrated key duplicator 25 with a cabinet 26 being provided with an on switch 27 and off switch 28. A coin slot 29 receives the appropriate predesignated change for releasing a suitable vending mechanism within cabinet 26 thereby depositing one universal key blank 33 (FIG. 2) into drawer 30. Drawer 30 is slidably mounted to cabinet 26 and may be pulled outwardly so as to allow the user to withdraw the universal key blank from the drawer. A second coin slot 31 is connected to another suitable vending mechanism within the cabinet for depositing various items, such as key chains, into drawer 32 which is also slidably mounted to the cabinet. The universal key blank 33 has a shank 34 having a length L, width W and thickness T greater than a typical key. A typical key 35 is shown in FIG. 3 having a head 36 and shank 37 with the traditional teeth 39 and grooves 40 being provided on the shank. In addition, a chain hole 38 is provided in the head of the key. As previously mentioned, the universal key blank shown in FIG. 2 has a width, length and thickness greater than the key shown in FIG. 3. Thus, key 35 may be duplicated by reducing the thickness, width and length of universal key blank 33 accordingly. In addition, grooves 40 and teeth 39 must be cut into the shank 34 of the universal key blank.

Cabinet 26 (FIG. 1) has a tracing stylus and a cutting stylus movably mounted behind the front wall of cabinet 26 respectively behind holes 42 and 44. The key 35 (FIG. 3) to be duplicated is inserted into hole 42 and the universal key blank 33 (FIG. 2) is inserted into hole 44. On switch 27 is then pushed inward thereby activating the tracing and cutting mechanism to be described later in this specification which automatically traces the key to be duplicated simultaneously cutting the universal key blank and producing a duplicate key.

A pair of identical key guide and locking block assemblies 58 are secured to the front wall of cabinet 26 adjacent holes 42 and 44 for respectively holding the key to be duplicated and universal key blank.

Figure 4:
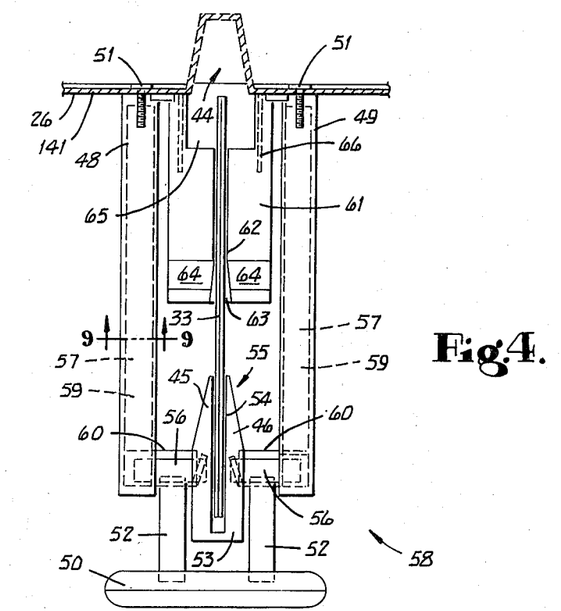
FIG. 4 is a top view taken along the line 4—4 of FIG. 1 and viewed in the direction of the arrows showing key guide and locking block assembly 58.
Figure 9:
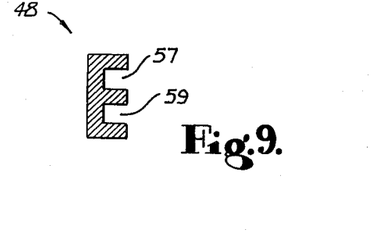
FIG. 9 is a cross sectional view taken along the line 9—9 of FIG. 4 and viewed in the direction of the arrows.

FIG. 4 is a top elevation viewed in the direction of arrows 4—4 of FIG. 1 of one of the identical key guide and locking block assemblies 58. A pair of guide rails 48 and 49 are cantilevered and secured to front wall 141 of cabinet 26 by fastening devices 51. The mutually facing sides of guide rails 48 and 49 are each provided with a pair of channels 57 and 59 (FIG. 9). Slidingly received by channels 57 in guide rails 48 and 49 are a pair of pins 56 which are attached to handle 50 by arms 52. The mutually facing ends of pins 56 are rotatably received by locking block 53 which has a groove 54 for receiving the key to be duplicated or the universal key blank. Groove 54 in FIG. 4 is shown as receiving universal key blank 33. Block 53 is bifurcated forming portions 45 and 46 which may be moved towards each other so as to grasp the head of key blank 33. Portions 45 and 46 are moved towards each other by pivoting handle 50 upwardly thereby forcing the mutually facing beveled ends of pins 56 against beveled surfaces within portions 45 and 46. A variety of other means may be utilized to grip the key blank 33. A pair of flat plates 60 having opposite ends slidingly received by channels 59 in guide blocks 48 and 49 are fixedly secured respectively to portions 45 and 46 thereby providing for stability of block 53. The shank of key blank 33 is moved into hole 44 by forcing handle 50 towards the cabinet thereby sliding the opposite ends of pins 56 in channels 57. A spring tensioned plate 61 is hingedly mounted to front wall 141 by self-leveling tension springs 66. Plate 61 is provided with a groove 62 for receiving the shank of the universal key blank. Plate 61 has a floor wall 63 supporting the lower edge of key blank 33. The leading edge 64 of plate 61 is beveled so as to force plate 61 to pivot downward at the hinge connection of spring 66 and wall 141 when abutted against the tapered leading end 55 of locking block 53. After the bottom edge of the key blank abuts wall 63, handle 50 is pushed further inward toward the cabinet and leading edge 55 eventually abuts beveled end portion 64 forcing plate 61 to pivot downward allowing the tapered end 55 to enter hole 44. A portion of plate 61 is cut out at 65 to prevent interference of the plate with the universal key blank as the plate is pivoted downward.

Suspendedly mounted behind cabinet front wall 141 (FIG. 5) is the tracing and cutting stylus 67. The stylus is held by a mechanism to be described later in this specification. A sectional view of stylus 67 taken along the line 6—6 of FIG. 5 and viewed in the direction of the arrows is shown in FIG. 6. Stylus 67 has a top and bottom plate 93 and 94 fixedly secured to blocks 89, 90, 91 and 92. The blocks are spaced apart so as to form slots 95 and 96 which are respectively positioned behind holes 42 and 44 (FIG. 1). Projecting into slot 95 are six tracing rods 75a, 75b, 75c, 74a, 74b and 74c each being fixedly mounted to cylindrical bodies 98 slidingly contained within cylinders 97 formed in the blocks. Springs 100 are biased against bodies 98 so as to force the rods into slot 95. Plugs 100' are threadedly received by the blocks securing springs 100 between the plugs and bodies 98. Each cylinder body 98 is fixedly connected to a rod 99 extending freely through spring 100, plug 100' and attached to one of the arms 81a, 81b, 81c, 78a, 78b or 78c. Key 35 of FIG. 3 is shown positioned in slot 95 abuttingly receiving rods 75a, 75b, 74a and 74b. Stylus 67 is moved vertically in a direction towards and opposite arrow 131 and is also moved horizontally allowing all rods 74a, 74b, 74c, 75a, 75b and 75c to eventually abut against the exterior key surface thereby tracing the outline of the key.

Universal key blank 33 projects into slot 96 with bits 73a, 73b, 73c, 72a, 72b and 72c projecting therein. Each bit is attached and is rotated by a motor 103 which is positioned within body 98 slidably housed by cylinder 97. The bits are biased into slot 96 by helical springs 100 abutting against cylinder bodies 98 and plugs 100' which are threadedly received into blocks 91 and 92. A rod 99 is fixedly attached between each body 98 and arms 79a, 79b, 79c, 76a, 76b and 76c. The bits are rotatably driven by motors 103 and are coupled with the rods projecting into slot 95 so as to appropriately cut universal key blank 33 as the rods projecting into slot 95 trace the outline of key 35.

Figure 5:
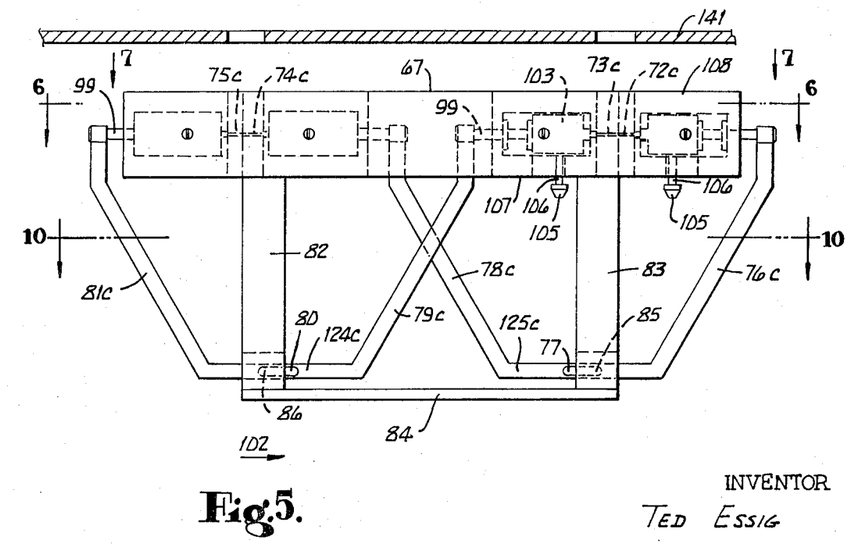
FIG. 5 is a bottom view of the tracing and cutting stylus positioned behind the front wall of the cabinet of FIG. 1.
Figure 6:
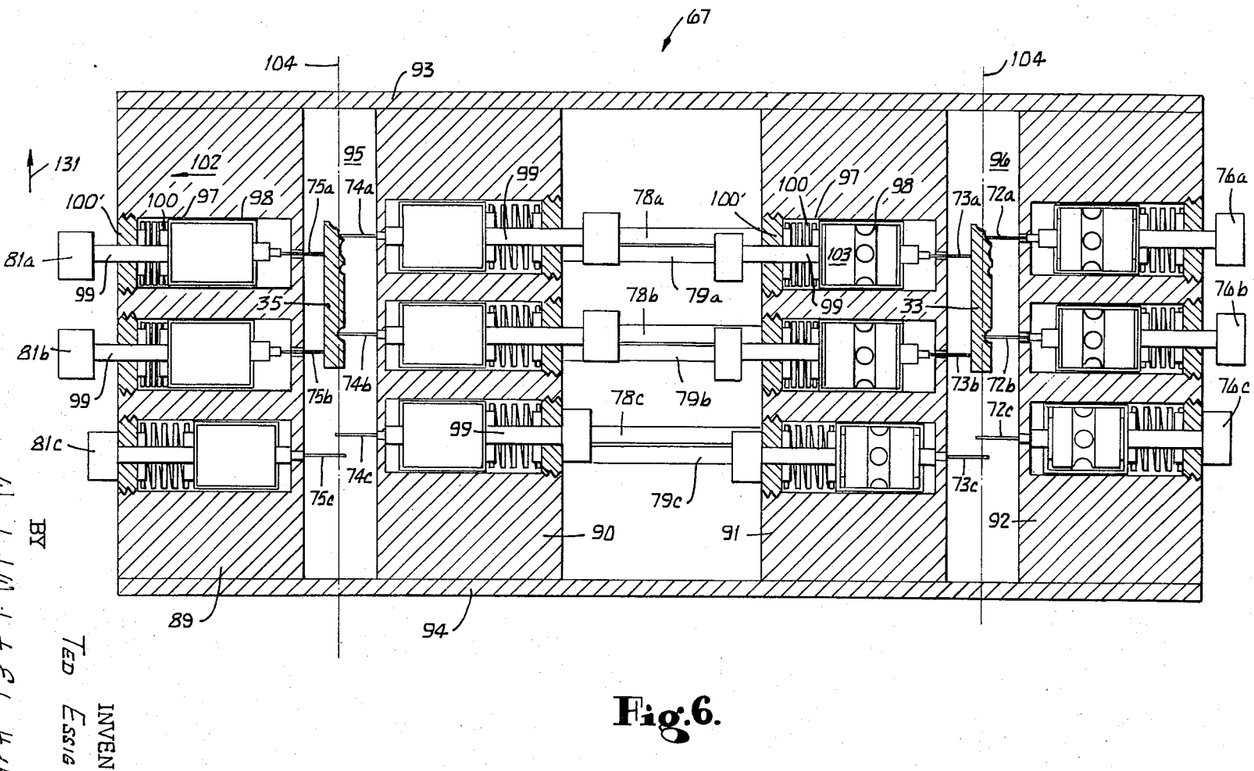
FIG. 6 is an enlarged sectional view taken along the line 6—6 of FIG. 5 and viewed in the direction of the arrows.
Figure 10:
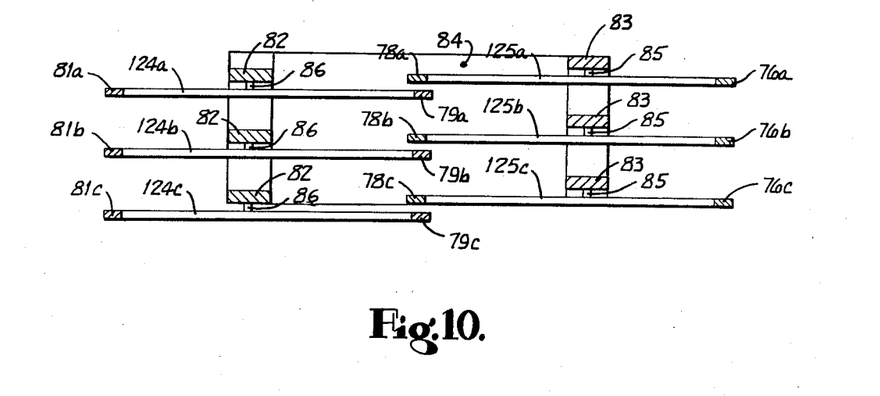
FIG. 10 is a cross sectional view taken along the line 10—10 of FIG. 5 and viewed in the direction of the arrows.

The coupling of the rods and bits will be more fully understood by referring to FIGS. 5, 6 and 10. Arms 81a, 81b and 81c are respectively joined to arms 79a, 79b and 79c by respectively members 124a, 124b and 124c. Members 124a, 124b and 124c have slots 80 with pins 86 being slidable therein. Pins 86 project down from supports 82 which are mounted to the back wall 107 of stylus 67. The rear ends of supports 82 are fastened to plate 84 which is secured to the rear ends of supports 83 mounted to stylus wall 107. Arms 76a, 76b and 76c are respectively joined to arms 78a, 78b and 78c by respectively members 125a, 125b and 125c. Members 125a, 125b and 125c (FIG. 5) have slots 77 with pins 85 projecting therein. It can be appreciated that when rod 75b (FIG. 6) moves in the direction of arrow 102, bit 73b will also move in the direction of arrow 102. Similarly, if rod 74a moves in a direction of arrow 102 bit 72a will move in a direction of arrow 102.

Motors 103 may be electrically operated or pneumatically driven. In the event that the motors are pneumatically driven, air pipes 106 (FIG. 5) extend into cylinders 97 being connected to motors 103. The back wall 107 of stylus 67 is slotted to allow pipes 106 to extend freely through as the motor and bit are driven in a direction towards and opposite arrow 102. A conventional nozzle 105 is connected on the end of each pipe 106 for fastening to an air hose.

The front wall 108 of stylus 67 is parallel with the front wall 141 of the cabinet. It should also be noted that rods 74a, 74b and 74c are each positioned (FIG. 6) above respectively rods 75a, 75b and 75c so as to overlap. This is required since in many cases the grooves on the opposite faces of key 35 may extend past the center line 104 of slot 95. The rods extend past the center line 104 when key 35 is not positioned in slot 95 and are in an overlapping position so as to prevent interference between one rod and another rod. Similarly, bits 72a, 72b and 72c and 73a, 73b and 73c are positioned in an overlapping manner extending past the center line 104 of slot 96.

Figure 7:
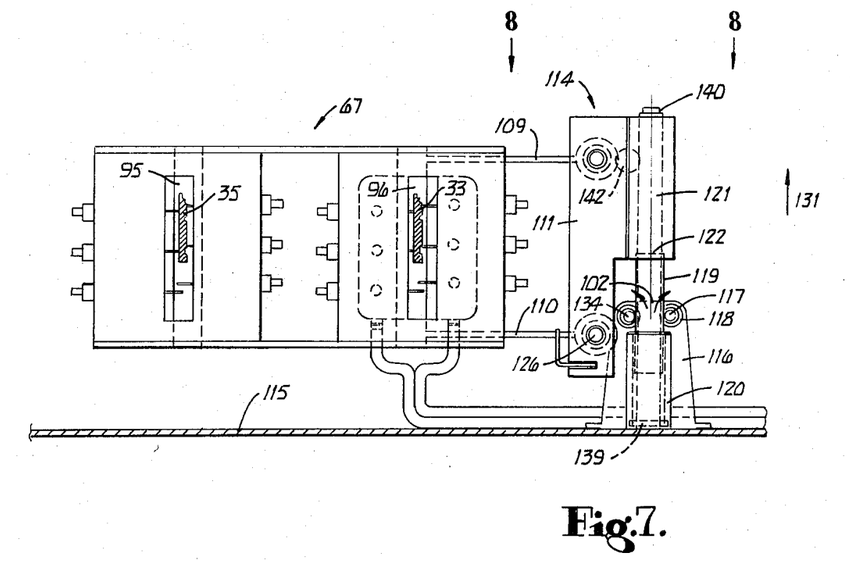
FIG. 7 is a front view rotated 180° of the cutting and tracing stylus viewed in the direction of arrows 7—7 of FIG. 5 and showing the stylus attached to the lifting and transverse drive mechanism 114.

FIG. 7 is a front view of stylus 67 showing a lifting and transverse drive mechanism 114 mounted to base plate 115 of the cabinet.

Figure 8:
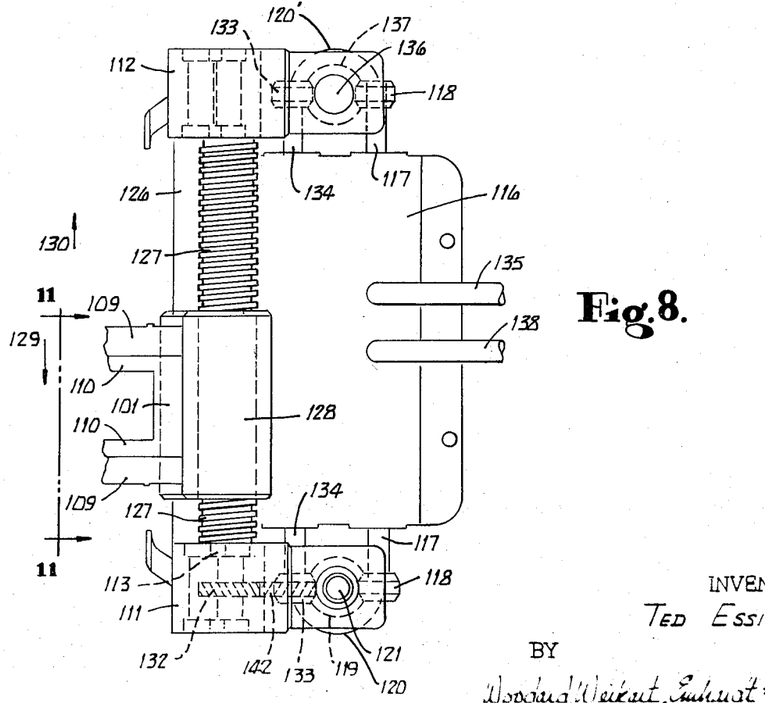
FIG. 8 is a fragmentary top elevation of the lifting and transverse drive mechanism 114 of FIG. 7 viewed in the direction of arrows 8—8.
Figure 11:
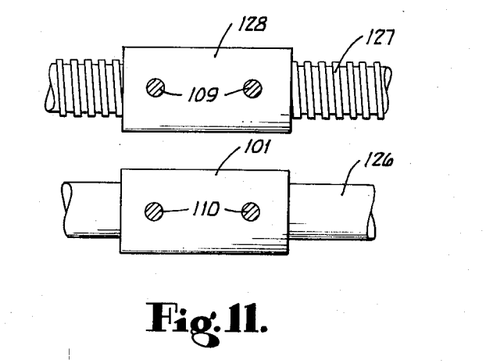
FIG. 11 is a fragmentary view looking in the direction of arrows 11—11 of FIG. 8.

FIG. 8 is a top fragmentary view looking in the direction of arrows 8—8 of FIG. 7 showing mechanism 114 connected to stylus 67. Referring now to FIGS. 7 and 8, a pair of upper rods 109 are fixedly attached to stylus 67 and carriage 128 which is threadedly received by worm 127. Worm 127 is generally parallel with the shank of the key to be duplicated when it is held in position. A lower pair of struts 110 fixedly attached to stylus 67 are fixedly attached to carriage 101 (FIG. 11) slidingly received by smooth rod 126. It can be appreciated that when worm 127 is rotated, carriage 128 will move in the direction of arrows 129 or 130 thereby also moving stylus 67 in the direction of arrows 129 or 130. Thus, stylus 67 is moved throughout the length of the shank of key 35 positioned within slot 95. Likewise, stylus 67 is moved about the length of universal key blank 33 positioned in slot 96. Worm 127 is rotatably received by front carriage 111 and back carriage 112. Rod 126 is fixedly mounted to carriages 111 and 112 whereas worm 127 is rotatably mounted to the carriages. The forward end of worm 127 is necked down 113 having a gear 132 fixedly attached thereon. Carriage 111 actually is hollow allowing gear 132 to freely rotate therein and having a second gear 142 mounted therein and in meshing engagement with gear 132. Gear 142 is also in meshing engagement with worm 121 which freely extends down through carriage 111 and into mounting block 120 fixedly attached to base plate 115. A gear 139 is fixedly attached to the bottom of worm 121 and is rotatably driven so as to rotate worm 121 thereby turning gears 142, 132 and rotating worm 127 forcing carriage 128 to move in the direction of arrow 129 or 130. Gear 139 is rotatably driven by an axle (not shown) extending out of housing 116 and being driven by input power shaft 138. Housing 116 includes various conventional gear mechanisms for receiving the power input from shaft 138 and translating this power into rotation of gear 139 and thus, further elaboration thereon would be superfluous. The top end 140 of worm gear 121 extends freely through and out of carriage 111. A stationary fixed rod 126 is mounted to block 120' which is secured to base plate 115.

Stylus 67 is movable in the vertical direction in a direction towards or opposite arrow 131 (FIG. 7) by a pair of axles 117 and 134 which extend through housing 116 and are rotatably driven in opposite directions by input lifting power shaft 135. Likewise, various conventional gear mechanisms are provided within housing 116 for transmitting the rotational power of shaft 135 to rotate shafts 117 and 134 in opposite directions and thus, further elaboration thereon would be superfluous. Mounted to both ends of axles 117 and 134 are respectively gears 118 and 133 which engage rack teeth provided on either side of lift sleeves 119 and 137. Lift sleeves 119 and 137 extend freely into mounting blocks 120 and 120' having hollow interiors. The hollow interior of lift sleeve 119 is sufficiently large so as to not touch the threads of worm gear 121. Likewise, the hollow interior of lift sleeve 137 is sufficiently large so as to not touch the exterior surface of vertical rod 136. The top ends of lift sleeves 119 and 137 are received in counterbores 122 provided in carriages 111 and 112. Thus, as axles 117 and 134 rotate in the direction of arrows 102 (FIG. 7) lift sleeves 119 and 137 will move in the direction of arrow 131 forcing carriages 111 and 112 as well as stylus 67 upward in the direction of arrow 131 along the width of the shank of key 35. Likewise, as axles 117 and 134 rotate in a direction opposite of arrows 101, the lift sleeves and carriages as well as stylus 67 will move downward in a direction opposite of arrow 131.

Rods 75a, 75c, 74a and 74c should have rounded or conically shaped ends whereas rods 75b and 74b may have a blunt end. Generally, the key shank is sufficiently wide so as to contact rods 75b and 74b at all times and as a result will not bend rods 75b and 74b as the stylus 67 moves vertically. Rods 75a and 74a however do not contact the key when stylus 67 is positioned in the most upward position. Likewise, rods 75c and 74c do not contact the key when the stylus is in the most downward position. Thus, the key may tend to bend rods 75a, 75c, 74a and 74c as the stylus moves to vertical or horizontal extremes. This problem is overcome by having conically or rounded tipped rod ends thereby providing a sloping rod end surface which slidingly contacts the edge of the key as the key moves past the rod gently easing the rods backwards until, for example, rods 75c and 74c are spaced apart a distance equalling the thickness of the key.

In order to operate the present invention, a coin is dropped into slot 29 and one universal key blank 33 is obtained from drawer 30. Key blank 33 is then inserted in a holder 58 adjacent to hole 44 and the key 35 to be duplicated is inserted into holder 58 adjacent to hole 42. The two holders are then pushed inward until the universal key blank and key extend through holes 44 and 42. "On" button 28 is then pressed thereby activating the tracing and cutting mechanism. At this time, stylus 67 is positioned at its most downward position. The holder is then moved horizontally by the transversing mechanism already described. That is, shaft 138 is rotated thereby rotating worm 121, gears 142 and 132 and worm 127 forcing carriage 128 and stylus 67 to move horizontally. Subsequent to styles 67 moving the entire length of the key shank, the lifting mechanism then slowly forces stylus 67 in the upward direction. That is, shaft 135 is rotated causing shafts 117 and 134 to rotate in opposite directions thereby causing gears 118 and 133 to engage the rack teeth of lift cylinders 119 and 137 forcing carriage 111 and 112 as well as stylus 67 to move upwardly allowing rods 74a, 74b, 74c, 75a, 75b and 75c to pass over the exterior surface of the key shank to be duplicated. As previously described, the rotating bits are coupled to the tracing rods. Blocks 94 and 91 are spaced apart to allow arms 78a, 78b, 78c, 79a, 79b and 79c to connect to rods 99 for moving respectively rods 74a, 74b, 74c, and bits 73a, 73b and 73c. Thus, the rotating bits 72a, 72b, 72c, 73a, 73b and 73c cut into the universal key blank thereby duplicating key 35 in blank 33. Then stylus 67 moves in a horizontal direction once again tracing over the key to be duplicated and cutting the grooves into the universal key blank. When the holder has reached its most upward position, the holder is moved back and forth horizontally and moved downward in increments. Stylus 67 may be activated in vertical increments and moved horizontally until eventually grooves 40 and teeth 39 are cut into the universal key blank. It can be appreciated that many passes may be required over the key to be duplicated to produce a final duplicate key. Likewise, standard limit switches and sensors are utilized to reverse the drive means to force the carriage up and down and backward and forward. In addition to cutting grooves 40 into the shank 34 of the universal key, the thickness of shank 34 may be greater than the thickness of shank 37 thereby also requiring the bits to reduce the thickness of the shank 34 so as to duplicate the key 35. Of course, it is understood that stylus 67 may also be moved in vertical sweeps and in horizontal increments.

A variety of cutting bits and tracing rods may be used having different configured tips. The tips for example, may be blunt, conical or rounded. Thus, grooves 40 (FIG. 2) may be duplicated even though the grooves are square, rounded or triangular in cross section. Best results are obtained when the diameters of the tracing rods and cutting bits are approximately one-sixteenth inch. Grooves 40 are typically wider than one-sixteenth inch and as a result will easily receive the tracing rods allowing better duplication. In one embodiment, the bits were rotated at a speed of 30,000 revolutions per minute.

The method of duplicating a key requires that the key blank and key be held and then the tracer rods are contacted forcefully against both sides of the key shank. The rods and key shank are moved with respect to each other so as to eventually contact the entire surface of both sides of the shank with the rods. Cutting bits are rotated on both sides of the blank and are coupled to the rods so the bits will move directly with the rods and duplicate the movement of the rods. The rods extend into the grooves in the sides of the key during the moving step and trace the outline of the key and any teeth thereon. During the moving step, the blank and key are held stationary and the rods and bits are cyclically moved horizontally and advanced vertically in increments.

Many variations in the present apparatus and method are contemplated and included by the present invention. For example, the rods are arranged in a first and second row perpendicular to the key sides whereas the cutting tools are arranged in a third and fourth row perpendicular to the blank sides. It is understood that additional rows of rods and tools may be employed.

It will be evident from the above description that the present invention provides an apparatus and a method for duplicating a key from a single universal key blank. It will be further evident from the above description that the present invention provides a key duplicator which will duplicate the grooves and teeth of a key into a universal key blank. The elimination of the necessity to select a specific key blank corresponding to the key to be duplicated allows the apparatus to be fully automatic.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A method of duplicating a key comprising the steps of:
   holding a key blank;
   holding said key;
   contacting tracer rods forcefully against both sides of the shank of said key;
   moving said rods and said shank with respect to each other so as to eventually contact the entire surface of both sides of said shank with said rods;
   rotating cutting bits on both sides of said blank; and,
   coupling said bits to said rods so said bits will move directly with said rods and duplicate the movement of said rods.

2. The method of claim 1 wherein:
   said rods extend into grooves in the sides of said key during said moving step; and,
   said rods trace the outline of said key and any teeth thereon during said moving step.

3. The method of claim 2 wherein:
   during said moving step said blank and said key are held stationary and said rods and said bits are cyclically moved horizontally with respect to said blank and key and are advanced vertically in increments; and,
   during said contacting step said rods are simultaneously contacted against both sides of said key.

4. An apparatus for duplicating a key having length and width from a key blank comprising:
   a carriage;
   a plurality of tracer rods mounted to said carriage;
   a plurality of cutting tools rotatably mounted to said carriage;
   first means coupling said tracer rods to said tools;
   second means opearable to cause movement between said rods and said key in a direction along said length;
   third means operable to cause movement between said rods and said key along said width; and,
   power means operable to rotate said cutting tools.

5. The apparatus of claim 4 wherein:
   said blank has a shank length, a shank width and a shank thickness greater respectively than the shank length, the shank width and the shank thickness of said key to be duplicated.

6. The apparatus of claim 4 additionally comprising:
   a key holder movable to position said key between said tracer rods;
   a blank holder movable to position said blank between said cutting rods, and wherein:
   said rods are arranged in first and second rows, said first row being positioned perpendicularly on one side of said key and said second row being positioned perpendicularly on the other side of said key;
   said tools are arranged in a third and fourth row, said third and fourth row being perpendicularly positioned on opposite sides of said blank;

said carriage has a first pair of blocks spaced apart forming a key receiving slot with cylinders provided in each of said blocks, said cylinders have springs biasing said rods into said key receiving slot; and, said carriage has a second pair of blocks spaced apart forming a blank receiving slot with cylinders provided in each of said blocks of said second pair, said cylinders have springs biasing said tools into said blank receiving slot.

7. The apparatus of claim 6 wherein:

said key holder and said blank holder are identical and each have a pair of guide rails with a block slidable thereon, each of said blocks is bifurcated with the resulting two portions spaced apart and closeable.

8. The apparatus of claim 7 wherein:

said power means is positioned within said cylinders of said second pair of blocks; and, said first means are arms each coupling one of said rods to one of said tools.

9. The apparatus of claim 8 wherein:

said second means is a rotatable worm generally parallel with the shank of said key, said second means has a cylinder threaded on said worm and fixedly secured to said carriage, said second means has a mounting member rotatably receiving said worm; and, said third means is a pair of counter-rotating axles with gears fixed to their ends, said third means has a lift cylinder with teeth thereon in meshing engagement with said gears, said mounting member rests atop said lift cylinder.

* * * * *